(12) United States Patent
Hayden et al.

(10) Patent No.: US 9,133,025 B2
(45) Date of Patent: Sep. 15, 2015

(54) HYDROGEN STORAGE MATERIALS

(75) Inventors: Brian Elliott Hayden, Lyndhurst (GB); Duncan Clifford Alan Smith, Southampton (GB); Jean-Philippe Soulie, Southsea (GB)

(73) Assignee: Ilika Technologies Limited, Chilworth, Southampton Hampshire (GB)

( * ) Notice: Subject to any disclaimer, the term of this patent is extended or adjusted under 35 U.S.C. 154(b) by 892 days.

(21) Appl. No.: 13/389,315

(22) PCT Filed: Jul. 20, 2010

(86) PCT No.: PCT/GB2010/001374
§ 371 (c)(1),
(2), (4) Date: Feb. 7, 2012

(87) PCT Pub. No.: WO2011/015803
PCT Pub. Date: Feb. 10, 2011

(65) Prior Publication Data
US 2012/0132850 A1    May 31, 2012

(30) Foreign Application Priority Data

Aug. 7, 2009    (GB) .................................. 0913932.0

(51) Int. Cl.
*C01B 31/16*    (2006.01)
*C01B 3/00*    (2006.01)
(Continued)

(52) U.S. Cl.
CPC .............. *C01B 3/0031* (2013.01); *C01B 3/0005* (2013.01); *C01B 6/24* (2013.01); *F17C 11/005* (2013.01); *Y02E 60/321* (2013.01); *Y02E 60/327* (2013.01); *Y02E 60/364* (2013.01)

(58) Field of Classification Search
CPC ............ C09K 3/00; C01B 3/005; C01B 3/02; C01B 3/04; C01B 3/508; C01B 3/56

USPC ............................................... 252/182.1, 184
See application file for complete search history.

(56) References Cited

U.S. PATENT DOCUMENTS 2,961,359 A * 11/1960 Lillie et al. ..................... 148/538
3,387,948 A * 6/1968 Snyder ........................... 423/644
(Continued)

FOREIGN PATENT DOCUMENTS

| CN | 101279717 A | 10/2008 |
| JP | 61-14102 | 1/1986 |

(Continued)

OTHER PUBLICATIONS

International Search Report for corresponding patent application No. PCT/GB2010/001374 dated Jan. 25, 2011.
International Report on Patentability for corresponding patent application No. PCT/GB2010/001374 dated Dec. 1, 2011.
Ikeda et al. "Formation region and hydrogen storage abilities of perovskite-type hydrides" *Prog. Solid State Chem.* 2007, vol. 35, 329-337.

(Continued)

*Primary Examiner* — Jane L Stanley
(74) *Attorney, Agent, or Firm* — Renner, Otto, Boisselle & Sklar, LLP

(57) ABSTRACT

The invention provides a hydrogen storage material consisting essentially of a hydride of lithium and magnesium, the material having the general formula: $Li_xMg_yH_n$ wherein: (i) x is in the range of from 0.17 to 0.93; (ii) y is in the range of from 0.07 to 0.83; and (iii) n is not greater than (x+2y); with the proviso that n is not (x+2y) when (a) x=y; (b) x=2y or (c) 2x=y. Methods of producing the hydrogen storage material and its use to store hydrogen reversibly or irreversibly are also provided.

30 Claims, 2 Drawing Sheets

(51) Int. Cl.
*C01B 6/24* (2006.01)
*F17C 11/00* (2006.01)

(56) References Cited

U.S. PATENT DOCUMENTS

| | | | | |
|---|---|---|---|---|
| 3,485,585 | A | * | 12/1969 | Snyder .................... 423/647 |
| 4,018,190 | A | * | 4/1977 | Henault .................... 123/3 |
| 4,200,623 | A | * | 4/1980 | Muller et al. ............... 423/644 |
| 5,069,894 | A | * | 12/1991 | Bogdanovic ............... 423/647 |
| 5,532,074 | A | * | 7/1996 | Golben ..................... 429/53 |
| 2003/0026757 | A1 | * | 2/2003 | Pecharsky et al. ......... 423/658.2 |
| 2004/0065171 | A1 | * | 4/2004 | Hearley et al. ............. 75/255 |
| 2007/0042223 | A1 | * | 2/2007 | Orimo et al. ............... 428/698 |
| 2013/0181162 | A1 | * | 7/2013 | Antonelli ................... 252/184 |
| 2013/0187085 | A1 | * | 7/2013 | Eigen et al. ................ 252/184 |

FOREIGN PATENT DOCUMENTS

| | | |
|---|---|---|
| JP | 2001-146408 | 5/2001 |
| JP | 2002-526658 | 8/2002 |
| JP | 2003-073765 | 3/2003 |
| JP | 2006-035161 | 2/2006 |
| JP | 2007-216095 | 8/2007 |
| JP | 2008-190004 | 8/2008 |
| WO | 00/20328 | 4/2000 |
| WO | 2005/035820 | 4/2005 |

OTHER PUBLICATIONS

Vajeeston et al. "First-Principles Investigations of the MMgH3 (M=Li, Na, K, Rb, Cs) Series",*JALCOM*, 2008, vol. 450, 327-337.
Ashby et al. "Preparation and Characterization of $LiMgH_3$, $LiMg_2H5$, $LiMgRH_2$, $LiMgR_2H$, and $LiMg_2H_3R_2$ Compounds" *Inorganic Chemistry*, vol. 17, No. 2, 1978, 322-326.
Li et al. "Electronic structure of the $LiMgH_3$ class of compounds: Cluster calculations" *Phys. Rev. B*, 1991, vol. 44, 6030-6036.
Khowash et al. "Electronic structure of light metal hydrides", *Phys. Rev. B*, 1997, vol. 55, 1454-1458.
Goto et al. "High-pressure synthesis of novel hydride in Mg-M systems (M = Li,Pd)", *JALCOM*, 404-406, 2005, 448-452.
Ikeda et al. "Formation ability of the perovskite-type structure in $Li_x Na_{1-x} MgH_3$ (x = 0,0.5 and 1.0)"*Acta Materialia*, 2005, 35, 3453-3457.
Guerin et al., "High-Throughput Synthesis and Screening of Hydrogen-Storage Alloys", *J. Comb. Chem*. 2008, 10, 37-43.
Guerin et al., "Physical Vapor Deposition Method for the High-Throughout Synthesis". *J. Comb. Chem*. 2006, 8, 66-73.
Vajeeston et al. First-principles investigations of the $MMgH_3$ (M=Li, Na, K,k Rb, Cs) series, *Materials*, 2009, 2, 2296-2318.

* cited by examiner

HYDROGEN STORAGE MATERIALS

This application is a national phase of International Application No. PCT/GB2010/001374 filed Jul. 20, 2010 and published in the English language.

FIELD OF THE INVENTION

This invention relates to a hydrogen storage material. The invention relates to a method of producing the material, the use of such a material for storing hydrogen reversibly or irreversibly and a method for reversibly desorbing and/or absorbing hydrogen using the hydrogen storage material.

BACKGROUND TO THE INVENTION

The storage of hydrogen in metal hydrides is based on chemisorption, i.e. no molecular hydrogen ($H_2$) is stored but the hydrogen reacts with the metal to form metal hydrides. Storage of hydrogen in the form of metal hydrides has the advantage over storage of hydrogen in, for instance, liquid or compressed state in that it does not require the use of low temperatures or high pressures.

The hydrogen compounds of the highly electropositive s-block elements are non-volatile, electrically non-conducting, crystalline solids generally containing hydride (H) anions. These properties, as well as their structures, lead to their classification as saline (salt-like) hydrides. The binary Group 1 metal hydrides share the crystal structure of sodium chloride (a face-centred cubic array of anions in which the cations occupy the octahedral holes). Lithium hydride (LiH) contains 12.5 wt % hydrogen, but requires 910° C. for an equilibrium pressure of $10^5$ Pa (1 bar). Because of its stability, LiH has not been considered as a practical hydrogen storage material.

Magnesium hydride ($MgH_2$) shares the crystal structure of rutile (a distorted hexagonal close-packed anion lattice in which the cations occupy half the octahedral holes). Magnesium hydride is one of the most studied materials for hydrogen storage mainly due to its high hydrogen content (7.6 wt %) and low manufacturing cost. However, its slow hydrogen absorption/desorption kinetics and high dissociation temperature of nearly 300° C. at $10^5$ Pa (1 bar) $H_2$ pressure limit its practical applications.

In 1978, Ashby et al. (*Inorg. Chem.*, 1978, 17, 322-326) prepared and characterized by X-ray diffraction the compounds $LiMgH_3$, $LiMg_2H_5$ and $Li_2MgH_4$ by mixing organolithium or mixed organolithium/magnesium compounds with $LiAlH_4$.

Relatively few theoretical studies exist on $LiMgH_3$: Li et al. (*Phys. Rev. B*, 1991, 44, 6030-6036) calculated the lattice spacing and the electronic structure and reported that $LiMgH_3$ is an insulator. Khowash et al. (*Phys. Rev. B*, 1997, 55, 1454-1458) calculated the cohesive energy and the electron density. Vajeeston et al. (*JALCOM*, 2008, 450, 327-337) predicted that the most stable arrangement for $LiMgH_3$ is the trigonal $LiTaO_3$-type structure. They also considered the formation energy of this compound and suggested a route to synthesis or stabilize $LiMgH_3$. The proposed pathway is from elemental lithium and magnesium in a hydrogen atmosphere.

Goto et al. (*JALCOM*, 404-406, 2005, 448-452) prepared $LiMg_2H_5$ under high pressure, typically 2-5 GPa at 973 K by using an anvil-type apparatus. This hydride exhibits a primitive cubic-type structure.

U.S. Pat. No. 2,961,359 published on 22 Nov. 1960 discloses magnesium alloy materials which retain strength at high temperatures for use in aircraft construction and the like. These alloys are based on crystalline hydrided lithium-magnesium alloys and are made by heating a lithium-magnesium alloy in a hydrogen atmosphere until substantially all the lithium is converted to a stable strengthening precipitate of finely divided lithium hydride dispersed in an essentially magnesium matrix. This annealing process promotes a crystalline structure which provides a hardening effect for the magnesium alloy, so that it is stable up to high temperature, since the lithium hydride is stable to 680° C. U.S. Pat. No. 2,961,359 thus provides an alloy of magnesium that retains its strength at elevated temperatures by exploiting the stability of the lithium hydride. Because the composition of U.S. Pat. No. 2,961,359 is crystalline (which is what gives it its strength), the composition is not suitable for reversibly storing hydrogen, since the lithium hydride is stable.

JP-A-2003-073765 discloses a hydrogen storage material with a body-centred cubic lattice crystal structure prepared by alloying magnesium, which has a close-packed hexagonal crystal lattice, with lithium, having a body-centred cubic lattice. As long as the resulting alloy has a body-centred cubic lattice, there is then a tetrahedral site available for occupancy by a hydrogen atom. However, to enable hydrogen absorption, it is then necessary to incorporate hydrogen dissociating substances, at least in the surface of the magnesium-lithium system, such as nickel, nickel alloys, palladium, palladium alloys, rare-earth hydrogen storage alloys, and titanium hydrogen storage alloys. These additional metallic components dissociate molecular hydrogen into atomic hydrogen to enable its absorption, and only small absorption of hydrogen is observed if insufficient hydrogen dissociating materials are present.

JP-A-2008-190004 discloses a wide range of magnesium-based hydrogen storage alloys of general formula $Mg_{1-x}M_xH_y$, wherein M may be at least one chosen from the group consisting of Li, Na, K, Rb, Ca, Sr, Ba, Sc, Ti, Zr, Hf, V, Nb, Ta, and Pd, where x=0.04 to 0.8 and y=0.2 to 2. Although various examples are given, a simple magnesium-lithium system is not described. Furthermore, the desirable goal of reduction in temperature for hydrogen desorption and/or in occlusion starting temperature is met by incorporating additional elements or compounds. The samples for which X-ray diffraction data are given show that the hydrogen storage materials are essentially crystalline.

There is still a need in the art for a hydrogen storage material that allows a reversible storage of hydrogen at low hydrogen uptake, low release temperatures and under mild rehydriding conditions.

SUMMARY OF THE INVENTION

It has now been found that hydrogen storage materials consisting essentially of hydrides of Li and Mg may be prepared. These materials may be reversibly dehydrided and rehydrided under mild conditions.

Accordingly, in one aspect, the present invention provides a hydrogen storage material consisting essentially of a hydride of lithium and magnesium, the material having the general formula:

$$Li_xMg_yH_n$$

wherein:
(i) x is in the range of from 0.17 to 0.93;
(ii) y is in the range of from 0.07 to 0.83; and
(iii) n is not greater than (x+2y);
with the proviso that n is not (x+2y) when (a) x=y; (b) x=2y or (c) 2x=y.

In another aspect, the present invention provides a method of preparing a hydrogen storage material consisting essentially of a hydride of lithium and magnesium, the material having the general formula:

$$Li_xMg_yH_n$$

wherein:
(i) x is in the range of from 0.17 to 0.93;
(ii) y is in the range of from 0.07 to 0.83; and
(iii) n is not greater than (x+2y);
comprising contacting metallic Li and/or a hydride thereof with metallic Mg and/or a hydride thereof such that a hydride of lithium and magnesium is formed.

In another aspect, the present invention provides a method of preparing a hydrogen storage material consisting essentially of a hydride of lithium and magnesium, the material having the general formula:

$$Li_xMg_yH_n$$

wherein:
(i) x is in the range of from 0.17 to 0.93;
(ii) y is in the range of from 0.07 to 0.83; and
(iii) n is not greater than (x+2y);
comprising vaporising Li and Mg from one or more sources and depositing the vaporised Li and Mg on a suitable substrate in the presence of a hydrogen source.

In a further aspect, the invention provides use of a hydrogen storage material consisting essentially of a hydride of lithium and magnesium, the material having the general formula:

$$Li_xMg_yH_n$$

wherein:
(i) x is in the range of from 0.17 to 0.93;
(ii) y is in the range of from 0.07 to 0.83; and
(iii) n is not greater than (x+2y);
to store hydrogen reversibly or irreversibly.

In a yet further aspect, the invention provides a method of absorbing hydrogen using a hydrogen storage material consisting essentially of a hydride of lithium and magnesium, the material having the general formula:

$$Li_xMg_yH_n$$

wherein:
(i) x is in the range of from 0.17 to 0.93;
(ii) y is in the range of from 0.07 to 0.83; and
(iii) n is not greater than (x+2y);
comprising contacting the hydrogen storage material with a hydrogen-comprising gas.

In a still further aspect, the invention provides a method of obtaining a hydrogen-comprising gas from a hydrogen storage material consisting essentially of a hydride of lithium and magnesium, the material having the general formula:

$$Li_xMg_yH_n$$

wherein:
(i) x is in the range of from 0.17 to 0.93;
(ii) y is in the range of from 0.07 to 0.83; and
(iii) n is not greater than (x+2y);
comprising desorbing hydrogen from the hydrogen storage material to obtain hydrogen gas and an at least partially dehydrided hydrogen storage material.

In a yet further aspect, the invention provides a method of reversibly desorbing and/or absorbing hydrogen using a hydrogen storage material consisting essentially of a hydride of lithium and magnesium, the material having the general formula:

$$Li_xMg_yH_n$$

wherein:
(i) x is in the range of from 0.17 to 0.93;
(ii) y is in the range of from 0.07 to 0.83; and
(iii) n is not greater than (x+2y);
the method comprising:
a) dehydriding the hydrogen storage material by desorbing hydrogen from the hydrogen storage material to obtain hydrogen gas and a partially dehydrided hydrogen storage material, whereby the desorption is monitored and terminated such that, upon termination, n is at least 0.1(x+2y); and
b) hydriding the partially dehydrided hydrogen storage material by contacting the partially dehydrided hydrogen storage material with a hydrogen-comprising gas to reversibly store hydrogen and to obtain an at least partially rehydrided hydrogen storage material.

In a still further aspect, the invention provides a method of fuelling a hydrogen-burning engine, comprising desorbing hydrogen from a hydrogen storage material according to the methods of the invention and feeding the desorbed hydrogen to the inlet of the hydrogen-burning engine.

These and other aspects of the invention are described below.

DETAILED DESCRIPTION OF THE INVENTION

Figure 1:
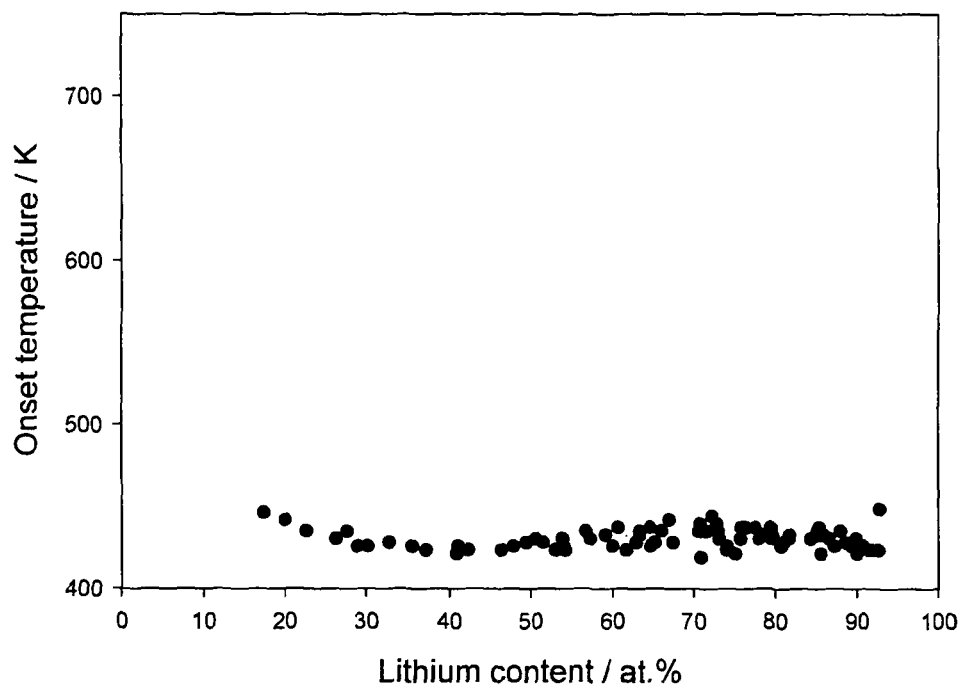
FIG. 1 illustrates the onset temperature of Li—Mg hydrogen storage materials of the present invention plotted as a function of lithium content.

The present invention provides a hydrogen storage material consisting essentially of a hydride of lithium and magnesium, the material having the general formula:

$$Li_xMg_yH_n$$

wherein: (i) x is in the range of from 0.17 to 0.93; (ii) y is in the range of from 0.07 to 0.83; and (iii) n is not greater than (x+2y); with the proviso that n is not (x+2y) when (a) x=y; (b) x=2y or (c) 2x=y.

In the above general formula, x is in the range of from 0.17 to 0.93 and y is in the range of from 0.07 to 0.83. Preferably, more than 50% of the metal atoms are Li atoms, i.e. x is in the range of 0.5 to 0.93; more preferably, x is in the range of from 0.6 to 0.8; even more preferably, x is in the range of from 0.7 to 0.8; still more preferably, x is in the range of from 0.74 to 0.78. Preferably, y is in the range of 0.07 to 0.5; more preferably, y is in the range of 0.2 to 0.4; even more preferably, y is in the range of 0.2 to 0.3; still more preferably, y is in the range of from 0.22 to 0.26. Compositions comprising increased amounts of Li may store higher gravimetric quantities of hydrogen due to its higher hydrogen storage density per weight of storage material.

Preferably, x is in the range of 0.5 to 0.93 and y is in the range of 0.07 to 0.5; more preferably, x is in the range of from 0.6 to 0.8 and y is in the range of 0.2 to 0.4; even more preferably, x is in the range of from 0.7 to 0.8 and y is in the range of 0.2 to 0.3; still more preferably, x is in the range of from 0.74 to 0.78 and y is in the range of from 0.22 to 0.26.

It will be appreciated that trace amounts of other metal atoms may be present in the hydrogen storage material according to the invention; however such trace amounts of other metals do not affect the hydrogen storage behaviour of the hydrogen storage material. Such traces of other metal atoms may be due to for instance impurities in the separate components or impurities introduced during the preparation of the hydrogen storage materials. Such traces of other metal atoms may substitute for Li, Mg or both. Typically, other Group 2 metal atoms or divalent transition metal atoms may substitute for Mg in the structure of the hydrogen storage material; other Group 1 metal atoms or univalent transition metal atoms may substitute for Li.

In this regard, the term 'consisting essentially of a hydride of lithium and magnesium' means that the total amount of lithium and magnesium atoms in the hydrogen storage material, expressed as a molar percentage of the total amount of metal atoms in the material, is at least 95%, preferably at least 97%, more preferably at least 98%, even more preferably at least 99%, still more preferably at least 99.5%, even more preferably at least 99.7%, still more preferably at least 99.8%, even more preferably at least 99.9%, still more preferably at least 99.95%, even more preferably at least 99.97%, still more preferably at least 99.98%, even more preferably at least 99.99%, still more preferably at least 99.995%, even more preferably at least 99.997%, still more preferably at least 99.998%, even more preferably at least 99.999%, still more preferably at least 99.9995%, even more preferably at least 99.9997%, still more preferably at least 99.9998%, even more preferably at least 99.9999%, and most preferably 100%.

The hydrogen storage material according to the invention and represented by the above formula comprises Li and Mg in a molar ratio (x/y) of in the range of from 0.2 to 13.3, preferably of from 1.5 to 4, more preferably of from 2.33 to 4, and most preferably from 2.85 to 3.55. The preferred molar ratios of Li and Mg provide the highest hydrogen gravimetric capacities.

The hydrogen storage material according to the above formula also comprises hydrogen. It will be appreciated that the amount of hydrogen depends on whether the hydrogen storage material is fully hydrided or partially hydrided.

When n is 0, no hydrogen is present in the hydrogen storage material. Typically, n is 0 only for hydrogen storage materials as prepared in the absence of hydrogen. However, it is preferred according to the present invention that the hydrogen storage material is prepared under a background atmosphere of hydrogen, such that the material contains some hydrogen and n is greater than 0.

Preferably, n is at least $0.1(x+2y)$. More preferably, n is at least $0.3(x+2y)$. Even more preferably, n is at least $0.5(x+2y)$. It has been found that the reversible hydrogen storage properties of the material according to the invention are most effective when the material contains the preferred proportions of hydrogen.

Preferably, n is not greater than $0.99(x+2y)$. More preferably, n is not greater than $0.95(x+2y)$. Even more preferably, n is not greater than $0.9(x+2y)$.

Preferably, n is in the range of from $0.1(x+2y)$ to $0.99(x+2y)$. More preferably, n is in the range of from $0.3(x+2y)$ to $0.95(x+2y)$. Even more preferably, n is in the range of from $0.5(x+2y)$ to $0.9(x+2y)$.

Suitably, the hydrogen storage material contains 1.18 to 11.66 wt. % hydrogen, preferably 3.53 to 11.19 wt. % and more preferably 5.89 to 10.6 wt. %. It has been found that the reversible hydrogen storage properties of the material according to the invention are most effective when the material contains the preferred proportions of hydrogen.

The hydrogen storage material according to the invention shows an onset-temperature of hydrogen desorption of the corresponding hydrides which is significantly lowered compared to LiH or $MgH_2$. Reference herein to the 'onset-temperature of hydrogen desorption' is to the lowest temperature at which hydrogen desorption is observed.

The hydrogen storage material according to the present invention provides high storage capacity for hydrogen while allowing retrieval of the hydrogen from the storage material relatively low temperatures.

Reference herein to 'dehydriding' is to desorption of hydrogen from the hydrogen storage material. Reference to 'hydriding' or 'rehydriding' is to adsorption of hydrogen by the hydrogen storage material.

In a preferred aspect, at least part of, preferably at least 5%, more preferably at least 50%, even more preferably at least 90%, still even more preferably 95% of the hydrogen storage material is amorphous. Reference herein to 'amorphous' is to a non-crystalline structure, i.e. at least part of the material has a disordered, non-crystalline structure. Reference herein to a non-crystalline structure is to a structure for which in an X-ray Diffraction (XRD) analysis no crystalline peaks can be identified.

As described above and without wishing to be bound to a particular theory, it is believed that the amorphous or non-crystalline structure is preferred due to its improved diffusion properties compared to the crystalline material: in particular, without wishing to be bound by theory, it is believed that the lack of a regular crystalline structure may allow hydrogen atoms or ions to move more freely through the structure.

The hydrogen storage materials according to the invention may be prepared by contacting metallic Li and/or a hydride thereof with metallic Mg and/or a hydride thereof such that a hydride of lithium and magnesium is formed. Preferably, the hydrogen storage materials according to the invention may be prepared by intimately mixing metallic Li and Mg or an inter-metallic compound of Li and Mg. Optionally, the Li, Mg and/or the inter-metallic compound of Li and Mg are in the form of the respective hydrides. The method is carried out in the presence of a hydrogen source. In this method, the hydrogen source may comprise, for example, a gas containing molecular hydrogen (preferably in an inert atmosphere as described and exemplified below), and/or may be bound in the metal hydrides when these are used as starting materials.

The components making up the hydrogen storage material may be intimately mixed in an inert atmosphere, i.e. in a vacuum or in an atmosphere comprising no other reactive gaseous or vapour component other than hydrogen. For instance, to prevent oxidation of one or more of the components, the atmosphere should not comprise oxygen. Examples of suitable inert atmospheres include nitrogen, argon and mixtures thereof.

A preferred method of preparing the hydrogen storage materials according to the invention comprises vaporising Li and Mg from a source and depositing the vaporised Li and Mg on a suitable substrate in the presence of a hydrogen source. In this method, the hydrogen source may comprise, for example, a gas containing molecular hydrogen (preferably in an inert atmosphere as described and exemplified above), or a plasma discharge source capable of generating atomic hydrogen. This method allows for the preparation of amorphous materials having the favourable properties described above.

Typically, the vapour deposition method described above is carried out under an ultra high vacuum system. Preferably, the vapour deposition method described above is carried out at a base pressure in the range of from $5\times10^{-9}$ Pa to $1\times10^{-6}$ Pa, more preferably in the range of $1\times10^{-7}$ Pa to $5\times10^{-6}$ Pa. In one particular example, the vapour deposition method described above is carried out at a base pressure of $1.3\times10^{-5}$ Pa.

Typically, the vapour deposition is carried out under a background hydrogen pressure in the range of from $5\times10^{-6}$ Pa to $5\times10^{-3}$ Pa, more preferably in the range of $1\times10^{-5}$ Pa to $1\times10^{-3}$ Pa. In one particular example, the vapour deposition method described above is carried out under a background hydrogen pressure of $6.9\times10^{-4}$ Pa.

Typically, the vapour deposition method described above is carried out on a substrate at a temperature in the range of 0 to 500° C., preferably 10 to 300° C. and more preferably 20 to 100° C.

The high-throughput physical vapour deposition (HT-PVD) methodology allows the direct synthesis of the metal hydrides according to the invention. Typically, the source of the atoms is a molecular beam epitaxy (MBE) source. Suitably, a "wedge" shutter is used to control the compositional range of the deposited material. The method is described in more detail in Guerin et al., *J. Comb. Chem.* 2008, 10, 37-43, in Guerin et al., *J. Comb. Chem.* 2006, 8, 66-73, and in WO2005/035820, the disclosures of which are hereby incorporated by reference.

The invention also relates to the use of a hydrogen storage material according to the invention to store hydrogen either reversibly or irreversibly. The hydrogen storage material according to the invention may be used alone or in combination with other materials to store hydrogen, for instance in hydrogen storage tanks or hydrogen batteries.

Hydrogen is stored in the hydrogen storage material by contacting the hydrogen storage material according to the invention with a hydrogen-comprising gas, preferably hydrogen gas. Suitably, the material is contacted with the hydrogen-comprising gas at an elevated pressure, preferably in the range of from 0.1 to 5 MPa, more preferably in the range of from 0.5 to 1.5 MPa. The temperature at which the hydrogen storage material is contacted with the hydrogen-comprising gas may be any suitable temperature, typically above 10° C., preferably in the range of from 10 to 150° C., more preferably in the range of from 15 to 50° C. Suitably, the hydrogen storage material is contacted with the hydrogen-comprising gas at ambient temperatures.

The hydrogen storage material is contacted with the hydrogen-comprising gas for any time necessary to sufficiently hydride the hydrogen storage material. Suitably, the material is contacted with the hydrogen-comprising gas for 1 to 24 hours, more preferably 5 to 10 hours.

A hydrogen-comprising gas may by obtained by desorbing, or withdrawing, hydrogen from an at least partially hydrided hydrogen storage material according to the invention. As a result of the desorption, a partially dehydrided hydrogen storage material is obtained.

Suitably, the desorption is monitored and terminated such that, upon termination, n is at least $0.1(x+2y)$—in other words, the material retains at least 10% of the maximum theoretical amount of hydrogen present (assuming all hydrogen is ionically bound). Preferably, the desorption is monitored and terminated such that, upon termination, n is at least $0.3(x+2y)$. More preferably, the desorption is monitored and terminated such that, upon termination, n is at least $0.5(x+2y)$. As will be described in more detail below, retaining this minimum amount of hydrogen in the hydrogen storage material enables the hydriding and dehydriding process to be carried out reversibly.

It is an advantage of the present invention that hydrogen may be desorbed from the hydrogen storage material according the invention at significantly milder temperature conditions compared to hydrogen storage materials comprising either Li or Mg as the sole metallic element. Consequently, hydrogen may be obtained from the hydrogen storage material at lower temperatures.

Depending on exact composition of the hydride and the desired equilibrium pressure, the at least partially hydrided material may be dehydrided by subjecting it to a sufficiently high temperature, preferably in the range of from 20 to 600° C., preferably 200 to 400° C. and more preferably 250 to 350° C., and a suitable pressure, preferably below the equilibrium pressure. Suitably, the equilibrium pressure is in the range of 0.05 to 5 MPa, more preferably 0.05 to 2 MPa, more preferably 0.05 to 1 MPa.

It has, however, been found that in order to be able to reversibly dehydride and rehydride the hydrogen storage material according to the invention, a minimum amount of hydrogen must remain in the obtained partially dehydrided hydrogen storage material. Therefore, in the method for reversibly desorbing and/or absorbing hydrogen using the hydrogen storage material according to the invention, the desorption is monitored and terminated such that, upon termination, n is at least $0.1(x+2y)$—in other words, the material retains at least 10% of the maximum theoretical amount of hydrogen present (assuming all hydrogen is ionically bound). Preferably, the desorption is monitored and terminated such that, upon termination, n is at least $0.3(x+2y)$. More preferably, the desorption is monitored and terminated such that, upon termination, n is at least $0.5(x+2y)$. Without wishing to be bound to a particular theory, it is presently believed that by limiting the amount of hydrogen removed from the hydrogen storage material, the formation of elemental Li and Mg is, at least partly, prevented. It is believed that the intermediate products other than elemental Li and Mg formed during dehydriding are susceptible to rehydriding.

It is an advantage of the present invention that the hydrogen storage material according the invention may be hydrided or rehydrided at significantly milder conditions compared to, for instance, LiH or $MgH_2$.

EXAMPLES

The present invention is illustrated by the following non-limiting examples.

Sample Preparation

Thin film samples were prepared using a 'wedge' growth method as described in Guerin et al., *J. Comb. Chem.* 2008, 10, 37-43, in Guerin et al., *J. Comb. Chem.* 2006, 8, 66-73, and in WO2005/035820.

Lithium and magnesium comprising thin films were deposited on silicon wafers (ex. Nova Electronic Materials Ltd) in a custom built ultra high vacuum system ($1.3\times10^{-5}$ Pa). The hydride samples were prepared in a background pressure ($6.9\times10^{-4}$ Pa) of hydrogen (ex. AirProducts, N5.5). Lithium (ex. Sigma Aldrich, 99.9%) was evaporated at 823K. Magnesium (ex. Alfa Aesaer, 99.98%) was evaporated at 712K. Compositional analysis was carried out using inductively coupled plasma mass spectroscopy with a laser ablation system.

Example 1

Material Characterization

A sample was analysed by X-ray Diffraction (XRD) using a Bruker D8 diffractometer using CuKα radiation ($\lambda_{Cu}=1.541$ nm) integrated for 3600s using a general area detector (GADS) over an integration range of 16.7 to 49.1 two theta. The source arm was setup at 11° and the detector at 25°, giving a spot size of approximately 1 $mm^2$. The samples were capped with an amorphous silicon dioxide film (ca. 100 nm) prior to XRD to prevent any oxidation.

No XRD peaks were identified in the XRD spectrum. This indicates that no detectable amounts of crystalline materials were formed and the prepared material was essentially amorphous.

Example 2

Dehydriding Measurements

Lithium and magnesium thin films were deposited on arrays of micro electro mechanical (MEMS) devices to perform temperature desorption experiments from the thin film material libraries. Temperature programmed desorption was carried out at a rate of 23° C. s$^{-1}$ within a high vacuum chamber (5×10$^{-7}$ Pa). The hydrogen partial pressure was measured using a quadrupole mass spectrometer placed 20 mm from the sample.

The hydrogen desorption behaviour of samples representative for the hydrogen storage material according to the invention, i.e. 0.17<x<0.93, 0.07<y<0.83 and 0.2<x/y<13.3, was determined using the above-described method.

FIG. 1 shows the hydrogen onset-temperatures (plotted as a function of lithium content) for the Li—Mg binary hydride system. For comparison, decomposition temperature is 993 K for LiH and 603 K for MgH$_2$.

All the hydrogen storage materials according to the present invention show significantly lower hydrogen desorption onset temperatures. The onset temperature was found to be relatively independent with increasing lithium content, within the data shown (FIG. 1) the lithium content varied between 17 and 93 at %.

Figure 2:
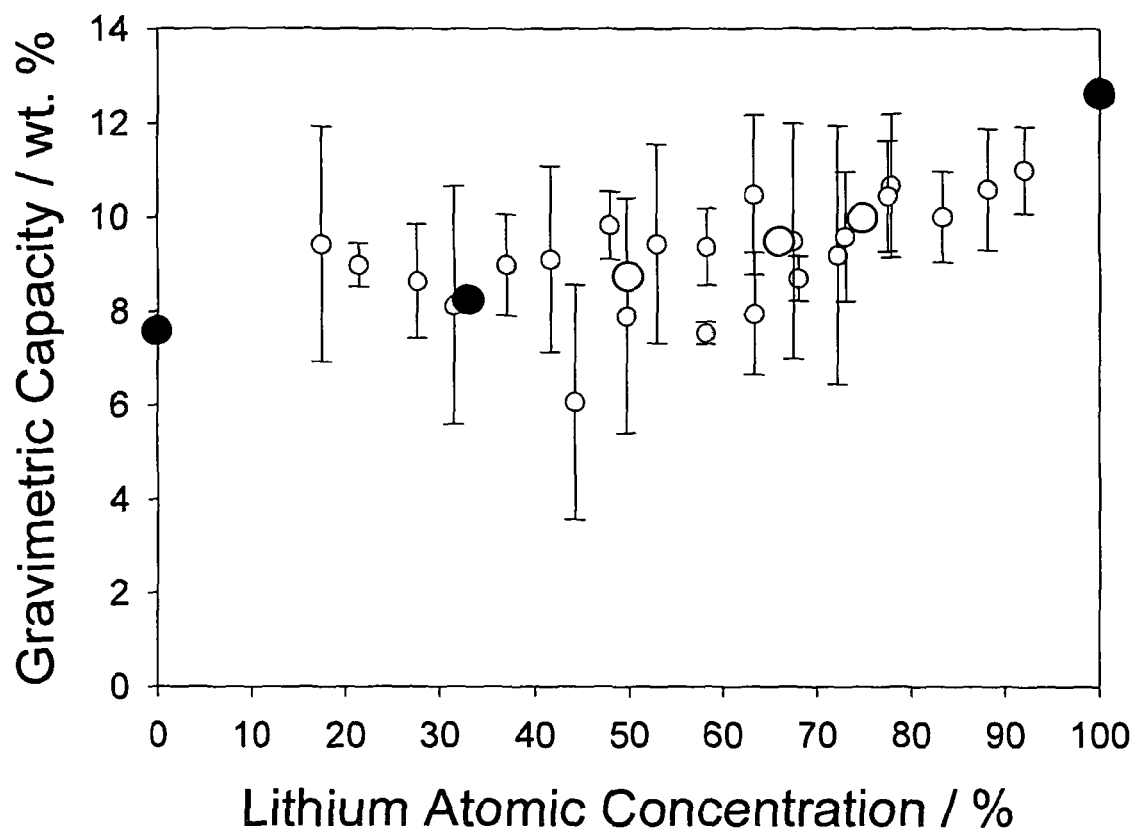
FIG. 2 illustrates the gravimetric capacity of Li—Mg hydrogen storage materials of the present invention plotted as a function of lithium content.

In order to determine the optimum composition for a storage material the gravimetric capacity was considered in addition to the onset temperature and given in FIG. 2 (the gravimetric capacity being plotted as a function of lithium content). In FIG. 2, points in grey are averages for the nearest 5%; black points are from experiments; white ones from density functional theory (DFT) calculations. Error bars shown are 1 standard deviation.

The gravimetric capacities of DFT predicted solid solutions are in agreement with the capacities observed in this present invention (FIG. 2). The highest hydrogen storage capacity (10.6 wt. %) was obtained for a hydrogen storage material having a composition of Li$_{0.76}$Mg$_{0.24}$.

Example 3

Dehydriding and Rehydriding Experiments

A sample as characterised in Example 1 was hydrided until no further uptake of hydrogen was observed. The hydride sample was dehydrided in a second step by a temperature programmed desorption carried out at a rate of 23 Ks$^{-1}$ within a high vacuum chamber. The hydrogen partial pressure was measured using a quadrupole mass spectrometer placed 20 mm from the sample. Dehydriding was discontinued at a temperature of 300° C. and cooled to room temperature at a rate of 23° C. s$^{-1}$. At this stage the hydrogen storage material still comprised approximately 8 wt. % hydrogen.

The obtained partially dehydrided sample was rehydrided in a third step by contacting the sample with hydrogen gas at a pressure of 10 bar for 8 hours under ambient temperature conditions (23° C.).

In a final step, the at least partially rehydrided sample obtained from the third step was again dehydrided following the same temperature program used for the initial sample to determine the amount of hydrogen which could be reversibly re-adsorbed. It was observed that up to 50% of the hydrogen desorbed in the second step from the initial sample was reversibly reabsorbed into the partially dehydrided hydrogen storage material. This shows that the hydrogen storage material according to the present invention can reversibly store hydrogen.

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in chemistry and materials science or related fields are intended to be within the scope of the following claims.

The invention claimed is:

1. A hydrogen storage material for reversibly storing hydrogen consisting essentially of a hydride of lithium and magnesium, the material having the general formula:

$$Li_xMg_yH_n$$

wherein:
(i) x is in the range of from 0.6 to 0.8;
(ii) y is in the range of from 0.2 to 0.4; and
(iii) n is not greater than (x+2y).

2. The hydrogen storage material according to claim 1 wherein x is in the range of 0.7 to 0.8 and y is in the range of from 0.2 to 0.3.

3. The hydrogen storage material according to claim 1, wherein n is in the range of from 0.1(x+2y) to 0.99(x+2y).

4. The hydrogen storage material according to claim 3, wherein n is in the range of from 0.3(x+2y) to 0.95(x+2y).

5. The hydrogen n storage material according to claim 4, wherein n is in the range of from 0.5(x+2y) to 0.9(x+2y).

6. A method of reversibly absorbing hydrogen using the hydrogen storage material according to claim 1, comprising contacting the hydrogen storage material with a hydrogen-comprising gas.

7. A method according to claim 6, wherein the hydrogen-comprising gas is at a pressure of 0.1 to 5 MPa.

8. A method according to claim 7, wherein the hydrogen-comprising gas is at a pressure of 0.5 to 1.5 MPa.

9. A method according to claim 6, wherein the temperature is in the range from 10 to 150° C.

10. A method according to claim 9, wherein the temperature is in the range from 15 to 50° C.

11. A method according to claim 6, wherein the hydrogen storage material is contacted with the hydrogen-comprising gas for 1 to 24 hours.

12. A method according to claim 11, wherein the hydrogen storage material is contacted with the hydrogen-comprising gas for 5 to 10 hours.

13. A method of obtaining a hydrogen-comprising gas from the hydrogen storage material according to claim 1, comprising desorbing hydrogen from the hydrogen storage material to obtain hydrogen gas and an at least partially dehydrided hydrogen storage material.

14. A method according to claim 13, whereby the desorption is monitored and terminated such that, upon termination, n is at least 0.1(x+2y).

15. A method according to claim 14, whereby the desorption is monitored and terminated such that, upon termination, n is at least 0.3(x+2y).

16. A method according to claim 15, whereby the desorption is monitored and terminated such that, upon termination, n is at least 0.5(x+2y).

17. A method of fuelling a hydrogen-burning engine, comprising desorbing hydrogen from the hydrogen storage material according to the method of claim 13 and feeding the desorbed hydrogen to the inlet of the hydrogen-burning engine.

18. A method of reversibly desorbing and/or absorbing hydrogen using the hydrogen storage material according to claim 1, the method comprising:
  a) dehydriding the hydrogen storage material by desorbing hydrogen from the hydrogen storage material to obtain hydrogen gas and a partially dehydrided hydrogen storage material, whereby the desorption is monitored and terminated such that, upon termination, n is at least 0.1(x+2y); and
  b) hydriding the partially dehydrided hydrogen storage material by contacting the partially dehydrided hydrogen storage material with a hydrogen-comprising gas to reversibly store hydrogen and to obtain an at least partially rehydrided hydrogen storage material.

19. A method according to claim 18, whereby the desorption is monitored and terminated such that, upon termination, n is at least 0.3(x+2y).

20. A method according to claim 19, whereby the desorption is monitored and terminated such that, upon termination, n is at least 0.5(x+2y).

21. A hydrogen battery comprising the hydrogen storage material of claim 1.

22. A hydrogen storage tank comprising the hydrogen storage material of claim 1.

23. A method of preparing a hydrogen storage material consisting essentially of a hydride of lithium and magnesium, the material having the general formula:

$$Li_xMg_yH_n$$

wherein:
  (i) x is in the range of from 0.6 to 0.8;
  (ii) y is in the range of from 0.2 to 0.4; and
  (iii) n is not greater than (x+2y);
  comprising intimately mixing metallic Li or a hydride thereof with metallic Mg or a hydride thereof such that a hydride of lithium and magnesium is formed.

24. A method of preparing a hydrogen storage material consisting essentially of a hydride of lithium and magnesium, the material having the general formula:

$$Li_xMg_yH_n$$

wherein:
  (i) x is in the range of from 0.6 to 0.8;
  (ii) y is in the range of from 0.2 to 0.4; and
  (iii) n is not greater than (x+2y);
  comprising vaporising Li and Mg from one or more sources and depositing the vaporised Li and Mg on a suitable substrate in the presence of a hydrogen source.

25. A method according to claim 24, wherein the hydrogen source comprises a gas containing molecular hydrogen.

26. A method according to claim 24, wherein the hydrogen source comprises a plasma discharge source capable of generating atomic hydrogen.

27. A method according to claim 24, wherein the vapour deposition is carried out at a base pressure in the range of from $5 \times 10^{-9}$ Pa to $1 \times 10^{-6}$ Pa.

28. A method according to claim 27, wherein the vapour deposition is carried out at a base pressure in the range of from $1 \times 10^{-7}$ Pa to $5 \times 10^{-6}$ Pa.

29. A method according to claim 24, wherein the vapour deposition is carried out under a background hydrogen pressure in the range of from $5 \times 10^{-6}$ Pa to $5 \times 10^{-3}$ Pa.

30. A method according to claim 29, wherein the vapour deposition is carried out under a background hydrogen pressure in the range of from $1 \times 10^{-6}$ Pa to $1 \times 10^{-3}$ Pa.

* * * * *